United States Patent [19]
Langen

[11] Patent Number: 5,351,979
[45] Date of Patent: Oct. 4, 1994

[54] TWO-WHEELED VEHICLE

[75] Inventor: Christianus P. Langen, Cuijk, Netherlands

[73] Assignee: Langenberg B.V., Cuijk, Netherlands

[21] Appl. No.: 986,135

[22] Filed: Dec. 4, 1992

[30] Foreign Application Priority Data

Dec. 5, 1991 [BE] Belgium .................... 91.01113

[51] Int. Cl.$^5$ .................................... B62M 3/06
[52] U.S. Cl. .................... 280/254; 280/270; 280/278
[58] Field of Search .......... 280/267, 254, 253, 260, 280/266, 270, 278, 287

[56] References Cited

U.S. PATENT DOCUMENTS

| | | | |
|---|---|---|---|
| 498,800 | 6/1893 | Kromer | 280/254 |
| 594,980 | 12/1897 | Booth et al. | 280/253 |
| 616,480 | 12/1898 | Mead | 280/254 |
| 642,013 | 1/1900 | Shellabarger | 280/254 |
| 1,597,639 | 8/1926 | Von Glahn | 280/254 |
| 2,182,345 | 12/1939 | Mieher | 280/263 |
| 3,981,516 | 9/1976 | Häggkvist | 280/263 |
| 4,440,414 | 4/1984 | Wang | 280/287 |
| 4,506,902 | 3/1985 | Maebe | 280/266 |

FOREIGN PATENT DOCUMENTS

| | | | |
|---|---|---|---|
| 0229597 | 7/1987 | European Pat. Off. | |
| 8622822 | 6/1988 | Fed. Rep. of Germany | |
| 3838802 | 5/1990 | Fed. Rep. of Germany | |
| 284200 | 11/1990 | Fed. Rep. of Germany | 280/266 |
| 284362 | 11/1990 | Fed. Rep. of Germany | 280/266 |
| 288572 | 4/1991 | Fed. Rep. of Germany | 280/266 |
| 288573 | 4/1991 | Fed. Rep. of Germany | 280/266 |
| 16722 | 8/1899 | United Kingdom | 280/266 |

*Primary Examiner*—Margaret A. Focarino
*Assistant Examiner*—Kevin Hurley
*Attorney, Agent, or Firm*—Webb Ziesenheim Bruening Logsdon Orkin & Hanson

[57] ABSTRACT

A two-wheeled vehicle comprising a frame having two wheels suspended rotatably therein, whereof the one is driven and the other is steerable relative to the frame via a subframe, wherein the frame bears a saddle-like seat element in addition to a rotatable steering member, wherein the subframe for the steerable wheel is situated under the seat element and the driven wheel under the steering member and wherein a coupling mechanism is arranged between the steering member and the subframe, whereby due to the reversal of the wheel function it is possible to directly drive the front wheel whereby the distance between both wheels can be considerably reduced, and therewith the length of the bicycle, while preserving a comparatively large wheel diameter.

20 Claims, 7 Drawing Sheets

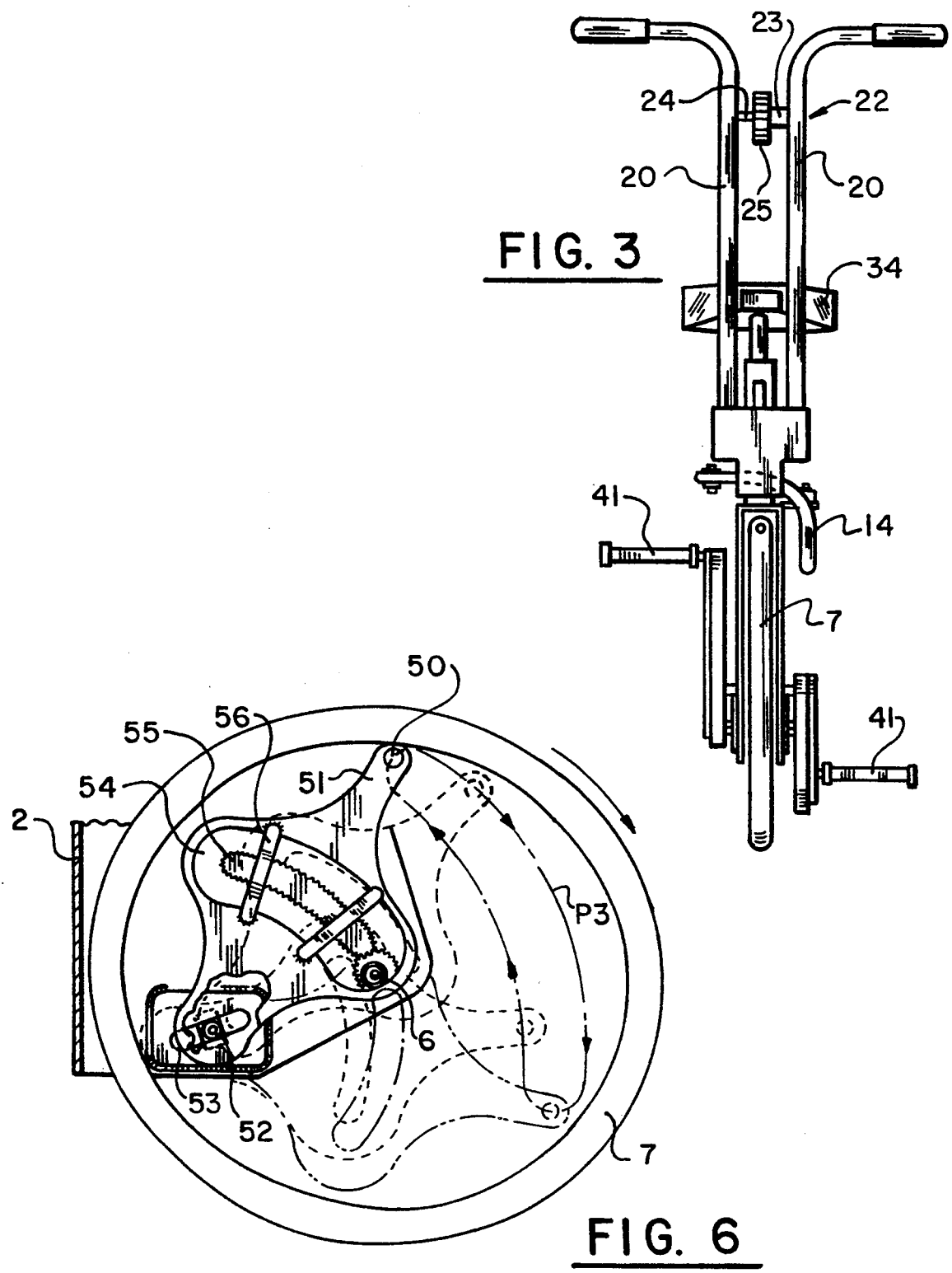

TWO-WHEELED VEHICLE

BACKGROUND OF THE INVENTION

The invention relates to a two-wheeled vehicle comprising a frame having two wheels suspended rotatably therein, whereof the one is driven and the other is steerable relative to the frame via a sub-frame, wherein the frame bears a saddle-like seat element in addition to a rotatable steering member.

Such a two-wheeled vehicle, also known by the name of "bicycle", is known in many different embodiments and serves mainly to transport a person who by means of individual effort drives one of the wheels, usually the rear wheel, via a pedal mechanism. The other wheel is connected to the steering member in order to hold the cyclist in balance and to steer the vehicle. It is also possible for the two-wheeled vehicle to be equipped with a motor which may or may not be arranged as auxiliary motor adjacently of the pedal mechanism. The pedal mechanism normally consists of a chain transmission, wherein the front sprocket wheel is located between the front and rear wheel, wherein the chain leads to a sprocket on the rear wheel. The drawback to such a vehicle is that it is of comparatively large dimensions and therefore difficult to transport in the trunk space of a car or the like. So-called "foldable bicycles" are already known which, however, have the drawback that they are not pleasant to ride because of the small wheels which result in poor road-holding. In the case of foldable bicycles with large wheels the wheels usually have to be disconnected from the frame, which involves a lot of work.

SUMMARY OF THE INVENTION

The invention has for its object to obviate the above stated drawbacks and provides for this purpose a two-wheeled vehicle which is distinguished in that the sub-frame for the steerable wheel is situated under the seat element and the driven wheel under the steering member, wherein a coupling mechanism is arranged between the steering member and the sub-frame.

Due to the reversal of the wheel function it is possible to directly drive the front wheel whereby the distance between both wheels can be considerably reduced, and therewith the length of the bicycle, while preserving a comparatively large wheel diameter.

In a further development of the bicycle it is recommended to provide the "fixed" front wheel with a pedal mechanism for driving thereof. In a particular embodiment the pedal mechanism is embodied with a lever which is arranged pivotally in the frame on one side and bears a pedal element on the other. The lever system makes it possible to place the pedal element or "pedal" far to the front, thus enabling a comfortable cycling stance, that is, with virtually straight knees while the seat element is nevertheless arranged in relatively low position so that when stopping the user can easily place his feet on the ground.

For a favourable power transmission the invention proposes to provide the lever with a contoured gear wheel which co-acts with a pinion mounted on the rotation shaft of the driven wheel, wherein the one end of the lever is arranged slidably in the frame.

In order to enable use of the bicycle as an easily transportable unit, the invention further proposes to embody the steering member pivotally with the frame for folding away thereof as well as the seat element. An exceptionally simple portable bicycle unit is herewith obtained.

BRIEF DESCRIPTION OF THE DRAWINGS

Above mentioned and other features of the invention will be further elucidated in the figure description hereinbelow of a number of embodiments. In the drawing:

FIG. 2 and 3 show respectively top and front views of the vehicle of FIG. 1, FIGS. 4 and 5 show respectively a top view and a standing side view of the vehicle of FIG. 1 in folded-up situation, FIG. 6 shows a side view on enlarged scale of a possible pedal mechanism for the driven front wheel of the vehicle of FIG. 1, FIGS. 7, 8 and 9 show in each case a side view corresponding with FIG. 6 of alternative embodiments of the pedal mechanism.

DESCRIPTION OF THE PREFERRED EMBODIMENT

Figure 1:
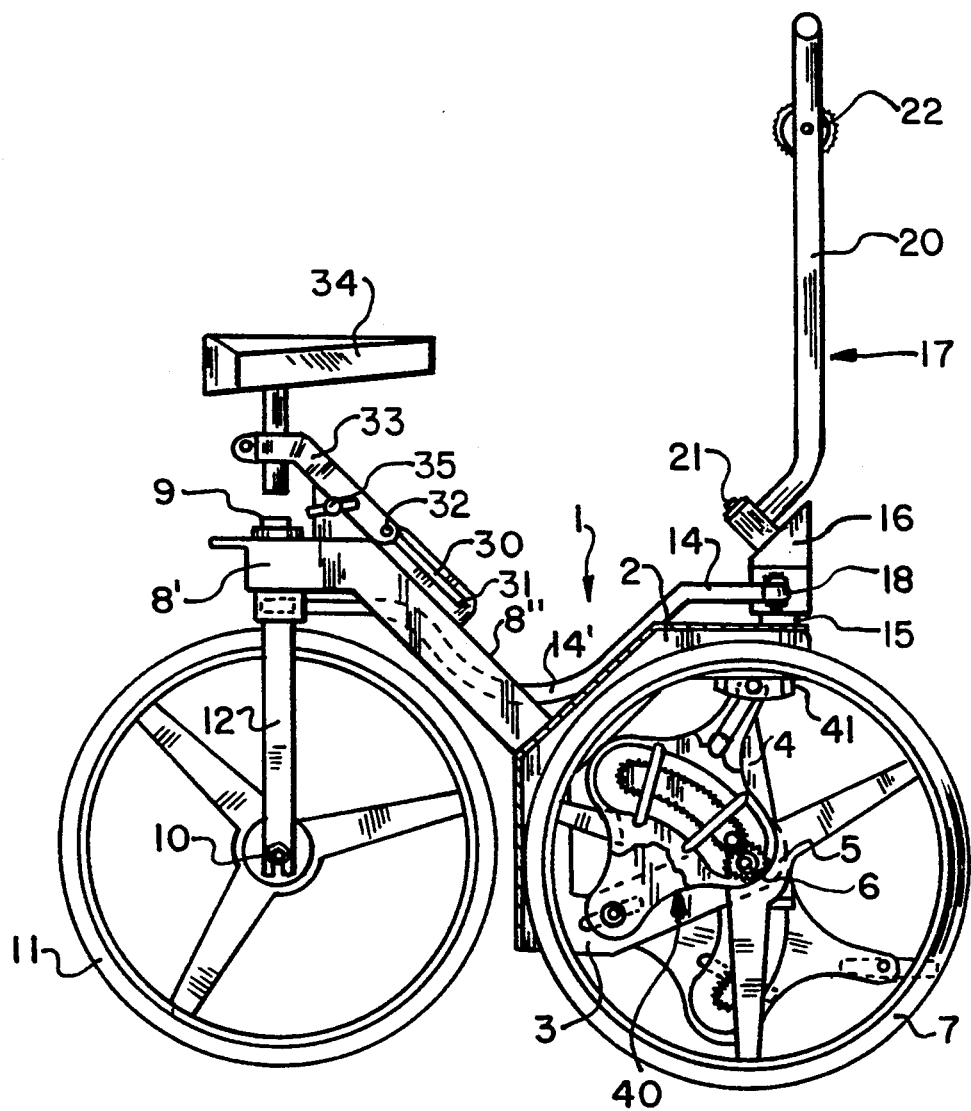
FIG. 1 shows a standing side view of a first embodiment of the vehicle according to the invention.

Designated in FIG. 1 with the numeral 1 is the frame which is constructed in the embodiment shown from steel plate which is bent into suitable shape and the diverse components of which can be welded to each other. Although different embodiments of the frame are possible, the frame shown consists of a first portion 2 which is U-shaped in cross section and polygonal in side view and which is provided on the underside with a forward pointing arm 3 and on the upper front side with a downward pointing arm 4, which arms connect mutually at an angle. The rotation shaft 6 of the fixed front wheel 7 is received in the angle portion 5 of the arms. This front wheel 7 is a three-spoke wheel with normal rim and pneumatic tire placed therearound, this such that the rim with tire can rotate inside the frame-like portion 2 between the arms 3 and 4.

The frame is further provided with a bent rear beam 8, the free rear end 8' of which extends in horizontal sense. Inserted into this portion 8' is a swivel pin 9 which is received in portion 8' by bearings (not shown) and which is provided at the bottom end with an attachment for the rotation shaft 10 of rear wheel 11. The rear wheel 11 is embodied in the same manner similar as wheel 7.

The sub-frame, which is formed here as a rear fork 12, is embodied close to the swivel pin 9 with a side arm 13, see also FIG. 2, to which a pull/push rod 14 is pivotally coupled, which is further elucidated hereinafter.

Arranged on top of the horizontal part of frame portion 2 is a shaft pin 15 onto which a carrier 16 of the steering member 17 is rotatably mounted. The front end of the pull/push rod 14 is pivotally connected to an arm 18 of the carrier 16. It is noted that in side view the pull/push rod comprises a downward curved portion 14', while the boom is also curved to the side at 14", see FIG. 2, such that the pivot point with arm 13 lies on the left-hand side of the vehicle and the pivot point with arm 18 on the right-hand side.

Figure 2:
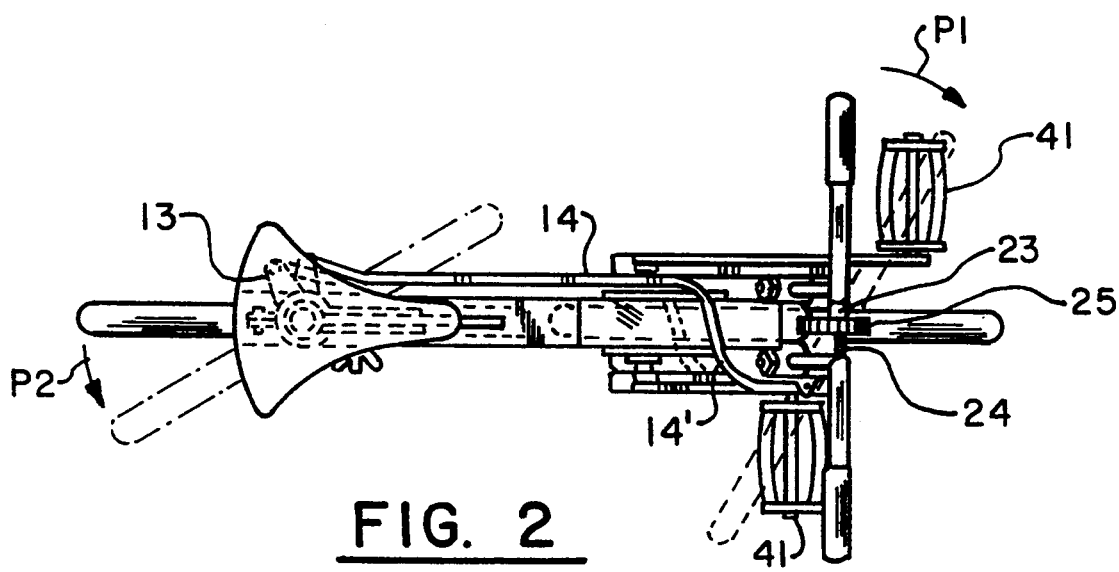

The construction is such that when the handlebar is swivelled in the direction of arrow P1 in FIG. 2 the rear wheel is swivelled in the direction of arrow P2.

The steering member 17 consists here of two upward oriented rods 20, each of which is connected to the carrier 16 on a pivot shaft 21. The pivot shaft 21 stands in the embodiment shown at an angle of 45° to the horizontal so that each arm 20 can be pivoted about this shaft 21 and in the folded position comes to lie in horizontal sense along the frame 1, which will be further elucidated. The two arms 20 of the steering member can be mutually connected at the top end by a screw mechanism 22 consisting of a screwed sleeve 23 and a threaded end 24, wherein the screwed sleeve can be turned manually with a serrated wheel 25. By inserting the threaded end 24 in the screwed sleeve 23 and rotating the screwed sleeve 23 by means of the serrated wheel 25 the coupling can be effected or released.

The upward sloping portion 8" of frame portion 8 is provided with a comb 30 with a slotted hole 31. Into the slotted hole is inserted a pin 32 of a support 33 onto which is fixed a seat element 34. The support 33 is provided with a slotted hole which co-acts with a clamping screw 35 on frame portion 8' in order to lock the seat element 34 in the position shown in FIG. 1.

Figure 7:
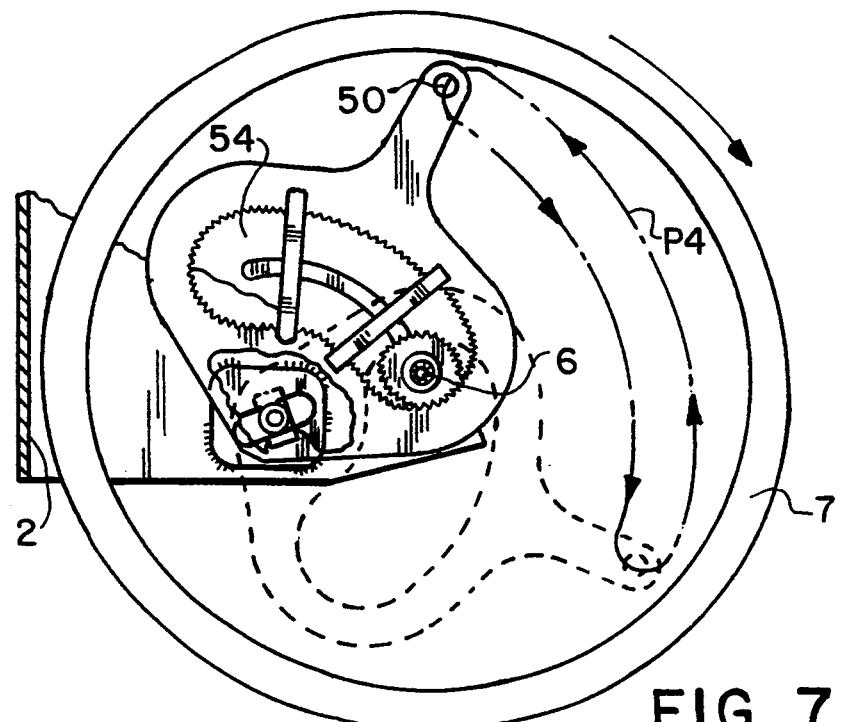
Figure 8:
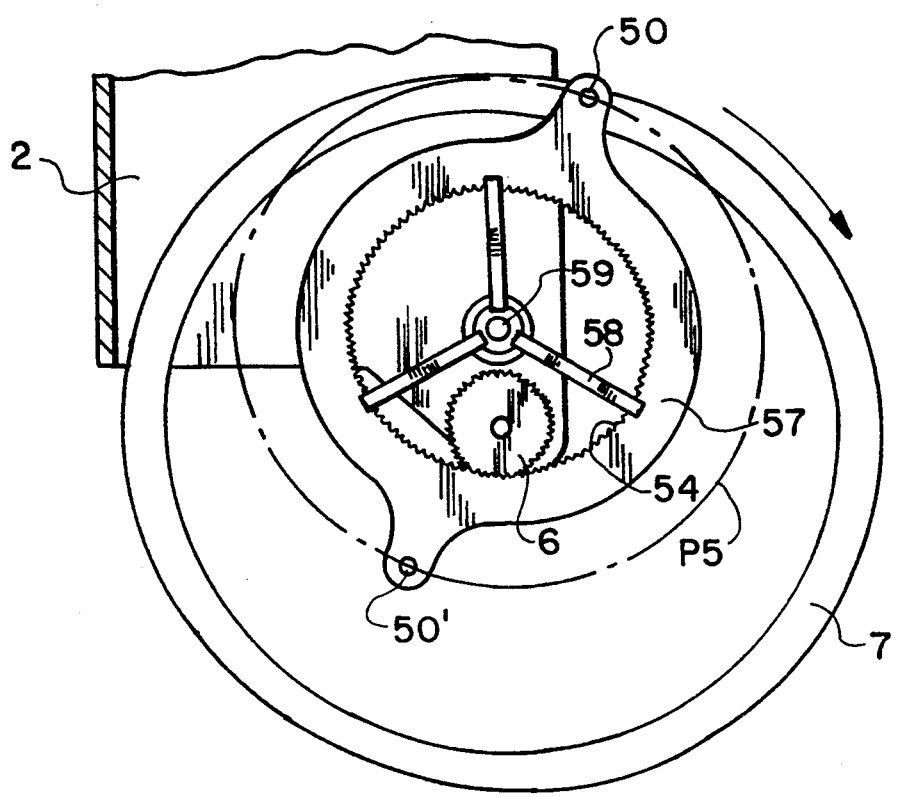

In the embodiment shown in FIG. 1 the front wheel 7 is driven by a pedal mechanism 40 which will be further elucidated with reference to FIGS. 6, 7 and 8. The pedal mechanism is provided with pedal elements or pedals 41 which can be placed such that easy operation thereof by the user of the bicycle becomes possible.

The above described vehicle is used as follows. In the operational situation the vehicle has the form as in FIG. 1, wherein the user assumes position on the seat element 34, lays the hands on the hand-grips of the steering member 17 and places the feet on the pedal elements 41. This can take place in the usual manner, wherein the pedal elements undergo a reciprocal or a rotating movement depending on the mechanism selected. Because the distance between the pedal element 41 in the extreme position relative to the seat element 34 corresponds with the normal bicycle, the power transmission to the pedals 41 is optimal. The saddle can nevertheless be placed in relatively low position so that the user can stand easily with the feet on the ground in the rest position.

Figure 5:
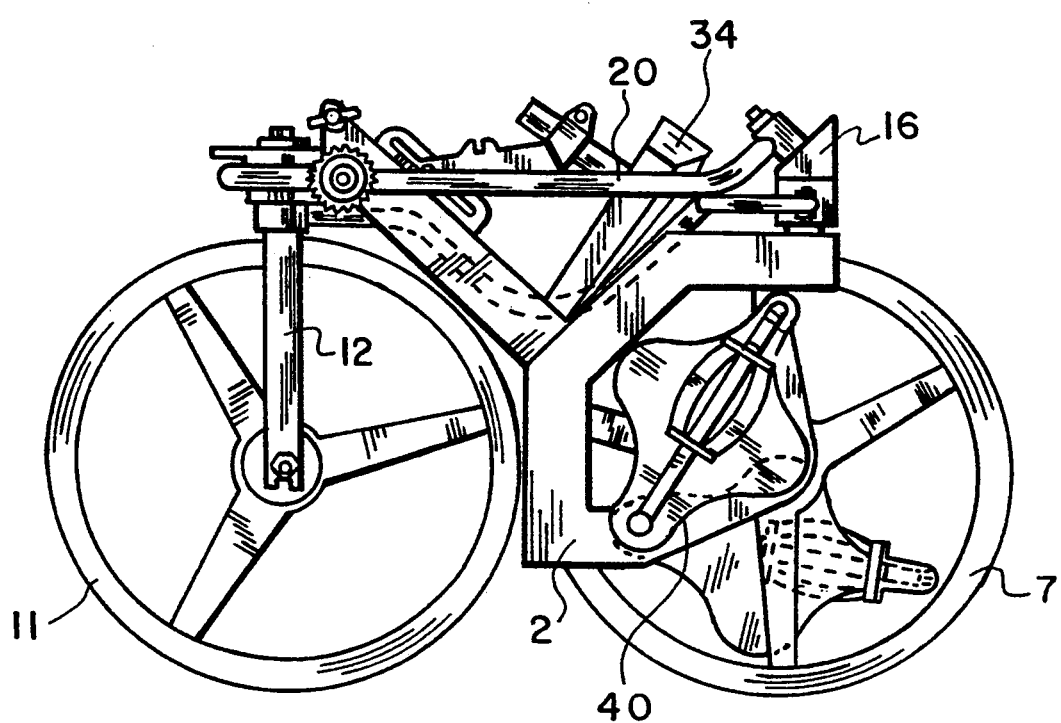

Should the user wish to carry the bicycle as a small unit, he then only has to loosen the clamping screw 35, whereby the support 33 with seat element 34 can be folded forward into the position according to FIG. 5, wherein the seat element 34 comes to lie in the bend of the frame. The handlebar can then be released at 22, whereby both steering tubes 20 can be rotated away about the shaft 21 into the position shown in FIG. 5. Thus created is an exceptionally small unit for carrying, wherein a wheel diameter of 50 cm can be assumed and the length of the unit is therefore no more than 1 m and the height less than this dimension.

If the frame and the wheels are embodied in plastic the weight can also be considerably limited.

Figure 4:
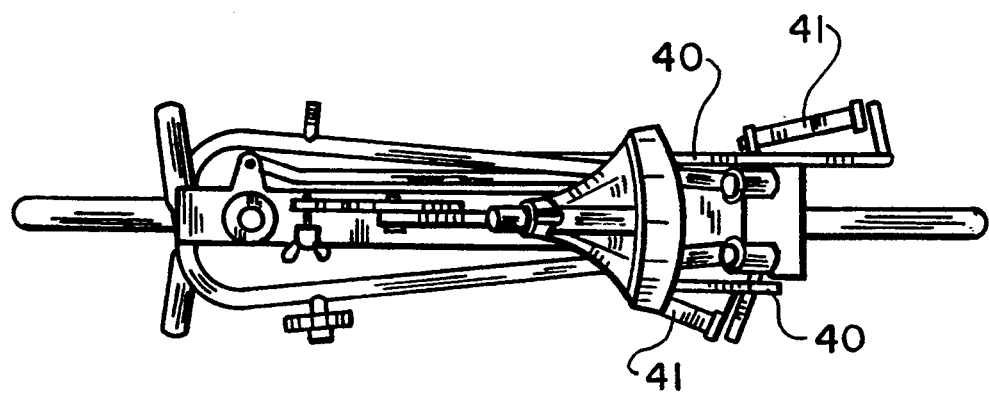

If desired the pedal elements 41 can likewise take a foldable form so that they can be extended along the pedal mechanism 40, see FIG. 4.

Figure 11:
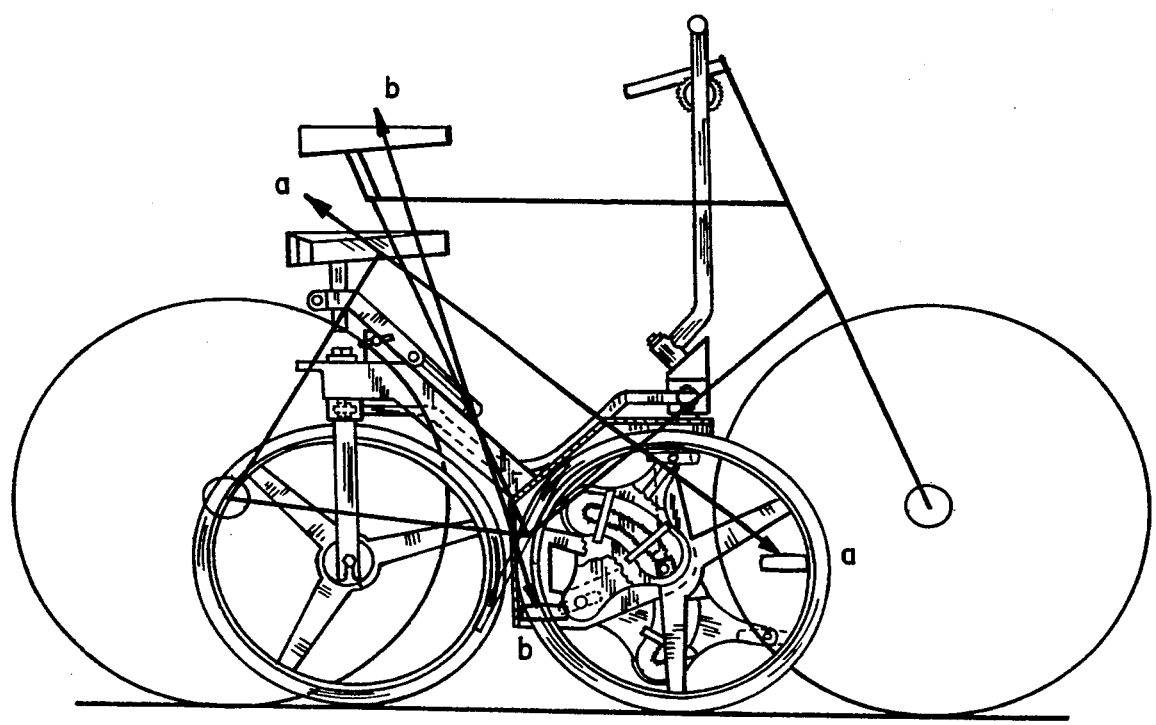
FIG. 11 is a standing side view in which is shown the relation between a "normal" bicycle and the bicycle according to the invention, FIG. 12a, b a schematic side view of a pedal mechanism for a bicycle according to a fourth embodiment, FIG. 13a, b, c and d a side view of a fifth embodiment of the pedal mechanism suitable for a drive for a bicycle.

The difference in size is shown in FIG. 11, wherein the bicycle according to the invention is compared with a bicycle of typically normal dimensions. The saddle can be placed in a lower position while preserving the same steering height, while the maximum distance between saddle and extended pedal can nevertheless remain the same, see the position indicated with the respective lines a and b in FIG. 11.

There now follows a description of the exceptional pedal mechanism according to the invention with reference to the FIGS. 6, 7, 8 and 9.

The pedal element 41 (not shown) is deemed to be rotatably fixed to a bearing opening 50 of a lever 51. The latter is fixed rotatably with the other end to a carriage 52 which is arranged slidably in a slot-like hole 53 of the frame portion 2.

The lever 51 is plate-like, in the middle portion of which a kidney-shaped opening 54 is recessed. Arranged in this opening is a contoured gear wheel 55 which is connected to lever 51 by means of strips 56. The gear rim of the contoured gear wheel 55 runs parallel to the inner periphery of the kidney-shaped opening 54, this such that a pinion fixed to the shaft of wheel 7 can run through in the closed path between the contoured gear wheel 55 and the inner wall of the kidney-shaped opening 54.

By moving the pedal element respectively the bearing eye 50 with the foot in the direction of the path indicated with arrow P3 the contoured gear wheel 54 provides a rotation of the pinion and therewith a rotation of the wheel 7.

It is noted that during this movement the carriage 52 moves reciprocally in the slot-like hole 53.

Due to this construction the cyclist can not only pedal with straightened legs but also effect a more favourable power transmission on the wheel 7, whereby cycling is made considerably easier.

FIG. 7 shows an alternative embodiment wherein like components are designated with like reference numerals. The lever is embodied here with a kidney-shaped hole 54 provided on the inner side with a gear rim which co-acts with the pinion on the rotation shaft 6 of wheel 7. This reversal of the driving of the gear system provides a path of movement of the pedal element, which is likewise arranged in the bearing eye 50, in reverse direction. See arrow P4. In both embodiments it has however been ensured that the movement of the pedal element is substantially up and down.

FIG. 8 on the other hand shows an embodiment wherein on either side of wheel 7 is arranged a circular element 57 as pedal lever having a gear rim which is arranged on the circular recess 54 and which co-acts with the pinion on the rotation shaft 6 of wheel 7. The circular element 57 is connected by means of strips 58 to a central bearing 59 which is supported by frame portion 2. By arranging the pedal element on the left-hand side of the cycle to the one eye and the pedal element on the right-hand side of the cycle to the opposite eye of the other circular member 57 driving of the wheel 7 can be realized by setting the pedal elements into rotation along the path P5. The pedal elements herein follow a circular path.

Figure 9:
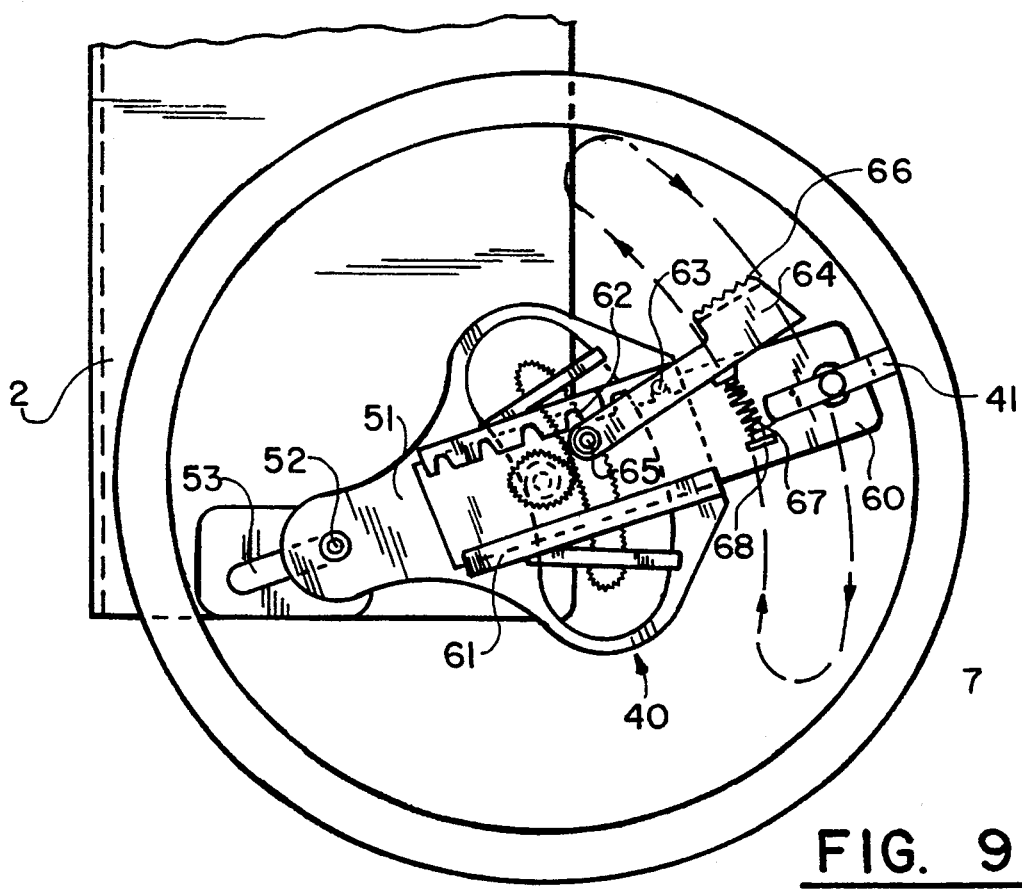

FIG. 9 shows an embodiment of a pedal mechanism 40 wherein the crank arm can be modified. In accordance with the foregoing embodiments according to FIGS. 6 and 7, the plateform lever 51 is pivotally attached with the other end to a carriage 52 which is arranged slidably in the slot-like opening 53 of the frame wheel 2. The pedal element 41 is not fixed directly to the one end of the lever 51 but to a separate strip 60 which is slidable in a guide 61 enclosing the longitudinal sides of the strip 60. This guide forms part of the lever 51. One of the guide strips is embodied with recesses 62 for receiving a cam 63. The cam 63 is arranged on an arm 64 which is connected rotatably at 65 to the strip 60. The free end of arm 64 is embodied with a pressing surface 66 for foot operation, wherein a pressure spring 67 is arranged on the opposite side of the arm 64, which spring bears on a support 68 of spring 60.

Setting of the desired crank arm is effected as follows. By pressing in the arm 64 counter to the action of spring 67 the cam 63 is released from the recess 62, whereby the strip 60 can slide in the direction of the other end 52 of lever 51, this into one of the positions wherein the cam 63 falls into another recess 62 of the guide 61. The distance between the pedal element 41 and the pivot point 52 of the arm 51 is thus adjusted as required, whereby a greater or smaller crank arm can be realized, which can cause the transmission to the pinion 6 to take place with smaller respectively greater force.

Figure 10:
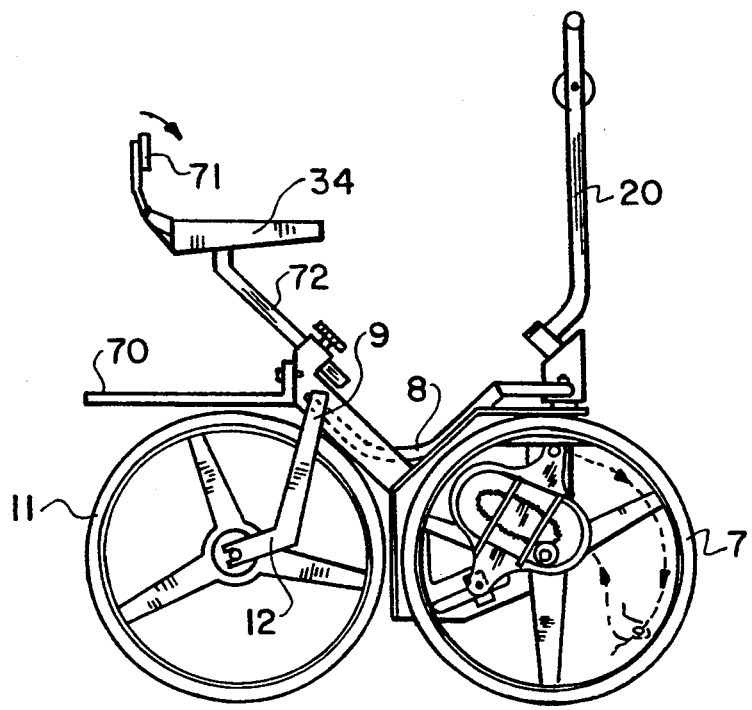
FIG. 10 shows a standing side view corresponding with FIG. 1 of an alternative embodiment of the vehicle according to the invention.

FIG. 10 shows an embodiment wherein the sub-frame 12 of the steerable rear wheel 11 is arranged at a position varying from the vertical. The pivot shaft is herein arranged in the upward inclining portion 8 of frame 1 and the swivel pin 9 lies in the same angle to the vertical as the sub-frame 12 bending away to the rear. This construction provides self-tracking of the rear wheel, which further improves the ride of the cycle. More space is furthermore obtained for a luggage carrier 70. The seat element with foldable back support 71 is here connected via a sliding rod 72 to the frame.

FIG. 12 shows a fourth embodiment of the pedal mechanism in which just the main parts of the pedal mechanism are disclosed. The pedal mechanism can be applied in a front wheel drive as shown in FIG. 1 or can be applied in a commonly known chain/chain wheel transmission.

The main difference to the former described embodiments is that the pedal elements 41 are moved along a circular path 80 instead of an oval path as depicted in FIG. 6. Each pedal element is provided with a crank 81, turning around a central axis 82. A central shaft 83 having a gear wheel 84 is coaxially mounted with respect to the central axis 82.

Each pedal element 41 is further provided with a lever 51 having a gear segment portion 85. One end of the lever 51 together with the adjacent gear segment 85 are journalled around the swivel axis 86 of the pedal element 41.

The other end of the lever 51 is provided with a sliding pin 87, which is guided in an oblong hole of a fixed guiding element 88.

Figure 12A:
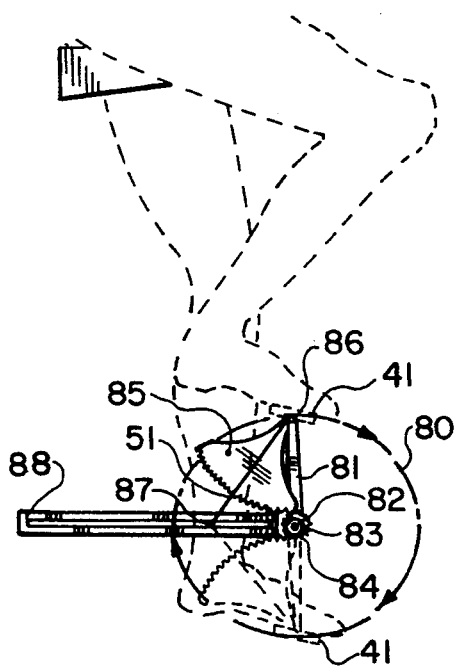

The two positions of FIG. 12a and b show clearly how the pedal mechanism is working. When rotating the pedal elements 41 along circular path 80 around the central axis 82, the lever 51 will be turned around by its end 86 along the same circular path. The other end 87 is guided along a straight path of guiding element 88, so bringing the gear segment 85 in rotation around swivel pin 86 according to arrow P6, resulting in a rotation of the gear wheel 84 according to arrow P7. It will be clear that the RPM of the gear wheel 84 is more than the RPM of the pedal cranks 81.

Figure 12B:
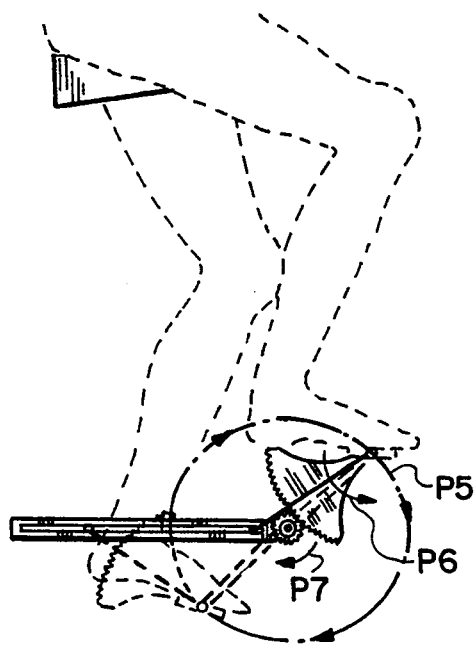

When the pedal 41 upper right in FIG. 12b is turned over half a circle and is brought in the lower most position (see FIG. 12a dotted line) then the gear segment will release the gear wheel 84, in the same moment the other gear segment 85 will begin with the co-operation with that gear wheel. So a continuous drive of the gear wheel 84 is obtained by turning around the pedals 41.

It is noticed that in this pedal mechanism the force acting on the pedal element 41 provided by the driver of the bicycle is brought more efficient to the gear wheel 84, resulting in a more efficient driving mechanism. So the driver will move faster when applying the same force on the pedal elements compared with a pedal crank mechanism as commonly used in chain transmissions.

The embodiment according to FIG. 13 is comparable with the embodiment according to FIG. 12, however, in a more compact form.

The main difference is that each gear segment 85 is provided with its own co-operating gear wheel 84, 84' coaxially aligned with each other and mounted for rotation around the same central axis 82.

Furthermore the guiding of the other end of the lever 51 by means of the sliding pin 87 is partly along a straight line 88' and partly according to a circular path 89.

Finally a stop 90 is arranged near the circular path of the pedal elements 41 and is located such that one of the extreme ends of the gear segment 85 will contact said stop to prevent further rotation in one sence.

It will be clear that the stop 90 and the guiding path 88', 89 are part of the fixed frame of the bicycle.

Figure 13A:
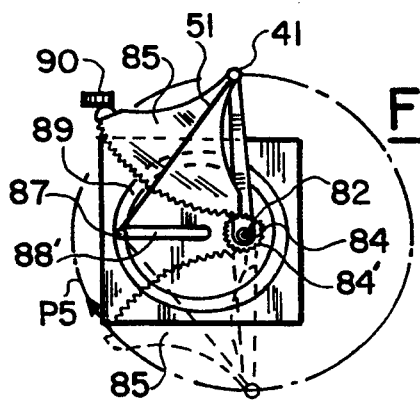

The compact pedal mechanism according to FIG. 13 works as follows:

Starting with FIG. 13a the upper gear segment 85 is at the beginning of the active step of the rotation, wherein the gear segment 85 meshes with its gear wheel 84 in order to rotate it according to arrow P7. The other end 87 of the lever 51 will follow the straight path 88', according to the similar function in FIG. 12.

Figure 13B:
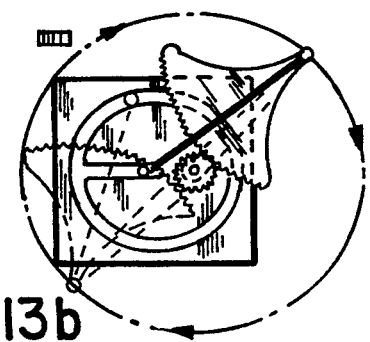
Figure 13C:
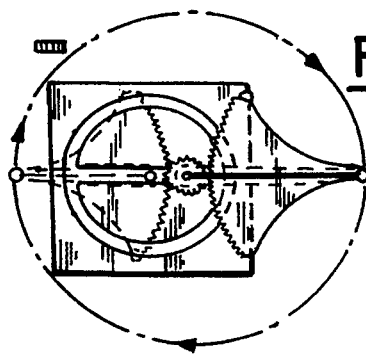

The lower segment, still being in meshing relationship with the gear wheel 84' is rotated according to arrow P5 during which movement the other ends 87 of the co-operating lever 51 will follow the circular path 89. This position is depicted in FIG. 13b, c and d.

Figure 13D:
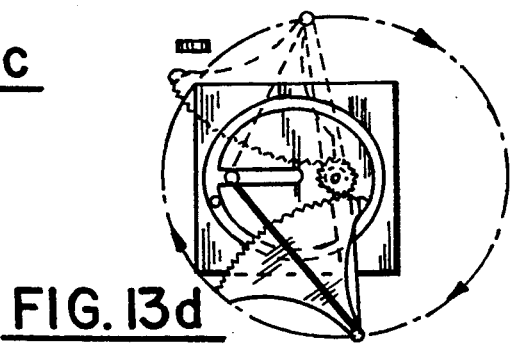

FIG. 13d depicts the moment, wherein the other ends of the two levers 51 are leaving the straight guide 88' on the one side and the moment the other lever will start at the beginning of the straight guide, so coming into a position as depicted in FIG. 13a, with this respect that the dotted segment is now the driving segment, whereas the straight line segment is the returning segment.

It is clear from FIG. 13 that the levers 51 will never come beyond the circular path 80 of the pedal elements 41, so obtaining a very compact embodiment compared with the other embodiments.

So it is possible to have a pedal mechanism according to FIG. 13 easily incorporated in a bicycle according to FIG. 1, so having the pedals 41 within the outer circumference of the front wheel seen in side view.

The pedal mechanisms as described hereabove are not limited to be used to a compact bike as depicted in FIG. 1. It is also possible to connect the gear wheels 84 to a chain transmission leading to a chain wheel in the rear wheel drive in a conventional bicycle.

The invention is not limited to the above described embodiments.

I claim:
1. A two-wheeled vehicle comprising:
   a frame;

two wheels rotatably suspended on said frame, wherein one of said wheels is a driven wheel and the other of said wheels is a steerable wheel steerable relative to said frame via a sub-frame;

a saddle-like seat element connected to said frame;

a rotatable steering member connected to said frame;

a coupling mechanism connected to and extending between said steering member and said sub-frame, wherein said sub-frame for said steerable wheel is positioned under said seat element, and said driven wheel is positioned under said steering member; and a pedal means connected to said frame for driving said driven wheel, said pedal means including a lever with one end of said lever guided for reciprocal movement relative to said frame and the other end of said lever coupled to a pedal element, and at least one gear means coupled to said lever adapted to drive a pinion mounted on a rotation shaft of said driven wheel.

2. The vehicle as claimed in claim 1, wherein said coupling mechanism includes a single push/pull rod pivotally connected to said steering member and said subframe.

3. A vehicle comprising:
a frame;
at least two wheels suspended rotatably on said frame, wherein one of said wheels is a front driven wheel and another of said wheels is a rear steerable wheel which is steerable relative to said frame via a sub-frame;
a saddle-like seat element connected to said frame;
a rotatable steering member connected to said frame; and
a pedal mechanism connected to said frame and co-acting with said front driven wheel, wherein said pedal mechanism includes a lever, at least one contoured gear wheel coupled to said lever which co-acts with a pinion mounted on a rotation shaft of said front driven wheel, wherein one end of said lever is guided for reciprocal movement relative to said frame and the other end of said lever is connected to a pedal element.

4. The vehicle as claimed in claim 3, wherein said pedal mechanism includes a crank arm rotatably mounted around a rotary axle, with said other end of said lever pivotally coupled to said crank arm.

5. The vehicle as claimed in claim 4, wherein said one end of said lever is guided in a guiding means for reciprocal motion partially in a straight line motion and partially in a circular motion.

6. The vehicle as claimed in claim 5, wherein the length of said pedal element of said pedal mechanism is adjustable.

7. The vehicle as claimed in claim 4, wherein the length of said pedal element of said pedal mechanism is adjustable.

8. The vehicle as claimed in claim 3, wherein said pedal mechanism includes a pair of said pedal elements each connected to one said lever with each said lever coupled to one said contoured gear wheel, wherein the contoured gear wheel of one of said pedal elements and the contoured gear wheel of the other of said pedal elements are both in permanent meshing relationship with said pinion.

9. The vehicle as claimed in claim 8, wherein the length of each said pedal element of said pedal mechanism is adjustable.

10. The vehicle as claimed in claim 9, wherein said pedal elements are pivotally connected to said lever for inward folding.

11. The vehicle as claimed in claim 8, wherein said pedal elements are pivotally connected to said lever for inward folding.

12. The vehicle as claimed in claim 8, wherein said sub-frame of said rear steerable wheel is connected to said frame through a rotation shaft which is positioned at an angle with respect to the vertical.

13. The vehicle as claimed in claim 3, wherein said sub-frame of said rear steerable wheel is connected to said frame through a rotation shaft which is positioned at an angle with respect to the vertical.

14. The vehicle as claimed in claim 3, wherein said steering member includes a carrier which is rotatably connected to said frame and upon which is connected at least one steering arm pivotally connected to said steering member.

15. The vehicle as claimed in claim 3, wherein said seat element is pivotally connected to said frame for inward folding.

16. A foldable two-wheeled vehicle comprising:
a frame;
a sub-frame pivotably coupled to said frame;
a driven wheel rotatably suspended on said frame;
a steerable wheel rotatably suspended on said sub-frame;
a seat element pivotally supported on said frame, said seat element pivotable between a first operative position and a second, compact stored position;
a rotatable steering member pivotably supported by said frame, said rotatable steering member pivotable between a first operative position and a second, compact stored position; and
a coupling mechanism positioned between said rotatable steering member and said sub-frame, wherein said sub-frame is positioned under said seat element positioned in said operative position, and said driven wheel is positioned under said rotatable steering member positioned in said operative position.

17. The vehicle as claimed in claim 16, wherein said rotatable steering member includes two rods pivotably connected to a pivot shaft positioned at an angle of about 45° with respect to the horizontal wherein said rods are configured to pivot about said pivot shaft to said operative position of said rotatable steering shaft and said stored position of said rotatable steering shaft.

18. The vehicle as claimed in claim 17, wherein said rotatable steering member further includes connecting means for connecting said rods together when said rotatable steering member is in said operative position.

19. The vehicle as claimed in claim 16, wherein said seat element is coupled to a support member, said support member including a pin which is received in a slotted hole of said frame, wherein said seat element pivots about said pin between said operative and said stored positions.

20. The vehicle as claimed in claim 19, further including a clamping means for clamping said seat element in said operative position.

* * * * *